Patented Sept. 23, 1952

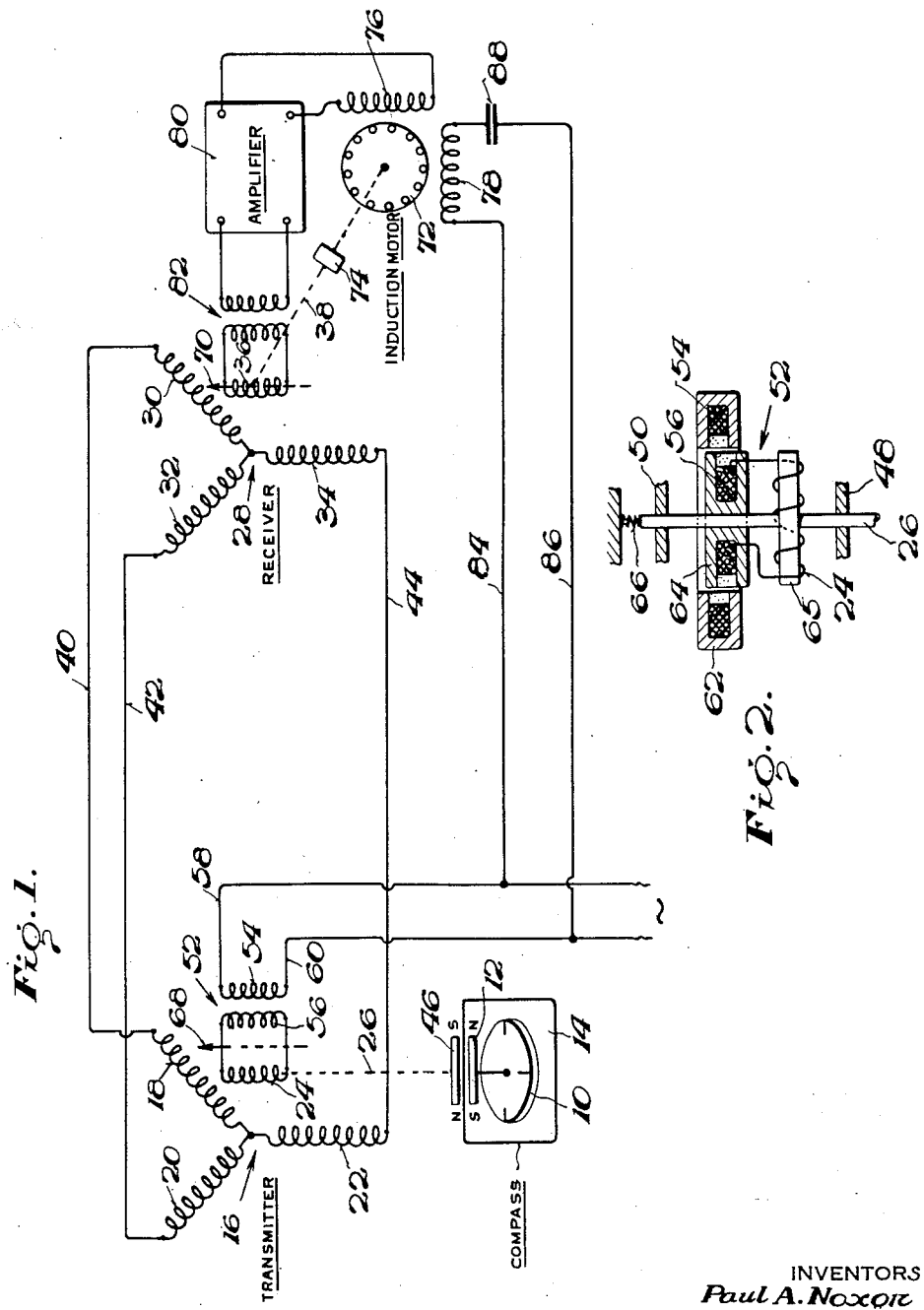

2,611,191

UNITED STATES PATENT OFFICE 2,611,191

TELEMETRIC OR REPEATER SYSTEM

Paul A. Noxon, Tenafly, and Wladimir A. Reichel, Hackensack, N. J., assignors to Bendix Aviation Corporation, Teterboro, N. J., a corporation of Delaware Application May 29, 1945, Serial No. 596,584

13 Claims. (Cl. 33—222)

The present invention relates to means for transmitting angular motion from one point to another and remote point, and more particularly to a novel telemetric or repeater system for transmitting the indications of a magnetic compass or other device to a remote point for indicating and/or control purposes.

One of the objects of the present invention is to provide novel apparatus for transmitting a function or condition accurring at one point to another and remote point.

Another object is to provide a novel telemetric or repeater system wherein the transmission of an indication of an indicating or measuring instrument to a distant repeater or indicator is effected in such manner as not to interfere in any way with the proper operation of the indicating or measuring instrument.

Another object of the invention is to provide a novel telemetric or repeater system for magnetic compasses wherein the directional indication of the magnetic compass is applied to the transmitting means without the necessity of utilizing mechanical connections to the magnet system or compass bowl of the compass.

A further object is to provide a novel telemetric or repeater system for magnetic compasses wherein the directional indication of the magnetic compass is applied to the transmitting means by a magnetic coupling comprising a follower magnetically arranged to follow movement of the compass to actuate the rotor of the transmitting means without the introduction of external power to actuate said rotor.

Still another object is to provide in an alternating current type of electromagnetic device having a wound stator and a wound rotor, a novel arrangement for energizing the winding of said rotor without the use of slip rings, brushes or sliding contacts.

A still further object is to provide in an alternating current type of electromagnetic device adapted for use as a transmitter or receiver and having a wound stator and a wound rotor, a novel construction for energizing the winding of said rotor without the use of slip rings or brushes and comprising a coupling transformer having a relatively stationary primary winding connected to the source of alternating current which is to energize the rotor winding of said electromagnetic device, and a relatively rotatable secondary winding carried on the same shaft as the rotor of said electromagnetic device and electrically connected to the winding of said rotor, whereby said rotor winding is energized by electromagnetic induction.

Another object resides in the provision of an arrangement of the foregoing character wherein movements of the compass or other device are transmitted to the transmitter of the telemetric system and the latter is energized from an external alternating current source in such manner as to eliminate static friction in the operation of the transmitter, thus materially decreasing the friction load in the transmission of the movements of the compass or other device and materially increasing the accuracy of the system.

Yet another object is to provide a novel coupling transformer having a relatively stationary primary winding connected to a source of alternating current and a relatively rotatable secondary winding carried by a rotatable shaft coaxial with said primary winding but slightly off-set axially along said shaft with respect to said primary winding, whereby the latter winding exerts a pulling or lifting effect on said rotatable secondary winding in an axial direction toward said primary winding to cause a slight vibratory axial movement of said shaft dependent upon the frequency of said alternating current, thereby substantially eliminating static friction in the bearings of said shaft.

A still further object comprehends a novel arrangement of parts in a system of the above character which is especially adapted for use with, but not limited to compass systems of the remote indicating type and wherein frictional loads in the system are substantially eliminated in order to secure extreme accuracy in the remote transmission of indications, notwithstanding the small torque resulting from variations in indications of the compass.

The foregoing and other objects and advantages of the invention will appear more fully hereinafter from a consideration of the detailed description which follows, taken together with the accompanying drawing, wherein one embodiment of the invention is illustrated by way of example. It is to be expressly understood, however, that the drawing is employed for purposes of illustration only and is not to be construed as defining the limits of the invention, reference for the latter purpose being had to the appended claims.

In the drawing, wherein like reference characters refer to like parts throughout the several views;

Figure 1 is a schematic wiring diagram of a telemetric or repeater system embodying the principles of the present invention as applied to a magnetic compass for transmitting the indications thereof to a remote point; and Figure 2 is a sectional view of a coupling transformer utilized in the system of Figure 1.

The invention consists substantially in the construction, combination, location and relative arrangement of the parts and circuits for obtaining the results desired in accordance with the foregoing objects, as will be more fully hereinafter set forth in the specification, as shown in the drawing by way of example, and as finally pointed out in the claims.

Referring now to Figure 1, the novel telemetric or repeater system of the invention is shown as applied to a magnetic compass of any suitable type, only the movable magnet system of the compass being illustrated for sake of simplicity. The magnet system comprises, as shown, a compass card or rose 10 having one or more north-seeking magnets or needles 12 suitably attached thereto, said card and magnets being generally pivotally mounted in a suitable compass bowl 14 for free rotation about a vertical axis under the influence of the horizontal component of the earth's magnetic field.

Arranged co-axially with and above the compass magnets 12 is an electromagnetic transmitting device 16 of the well-known self-synchronous, electromagnetic motor type having a stator including three windings 18, 20 and 22, equally angularly spaced 120° apart and interconnected in the manner of a three-phase winding, and a rotor inductively related to the stator and including a single phase winding 24 carried by a vertical shaft 26 coincident with the vertical axis about which the compass magnets 12 are adapted to rotate under the influence of the horizontal component of the earth's magnetic field.

The self-synchronous transmitter 16 is electrically connected to a remote electromagnetic device 28 which is also of the self-synchronous motor type identical to said transmitting motor and having a stator including three windings 30, 32 and 34, equally angularly spaced 120° apart and interconnected in the manner of a three-phase winding, and a rotor inductively related to the stator and including a single phase winding 36 carried by a shaft 38. Windings 18, 20 and 22 of the transmitter 16 are respectively connected with the windings 30, 32 and 34 of the receiver by means of leads 40, 42 and 44.

In order that movements of the compass card 10 and compass magnets 12 may be transmitted to the shaft 26 for varying the angular relationship between the rotor 24 and the stator windings of the transmitter 16, one or more follower or slave magnets 46, equal in number to the compass magnets 12, are mounted on the lower end of shaft 26 in magnetic relationship with the compass magnets. Thus, while no mechanical connection is employed between the shaft 26 and the compass card 10, any movement of the latter and the compass magnets 12 connected thereto will effect, through the magnetic relationship between the compass magnets and the slave magnets, a corresponding movement of the shaft 26, so that the rotor 24 carried thereby, will move angularly an amount equal to the degree of movement of the compass card.

In installations of the above-described character, it will be understood that the shaft 26 is mounted within suitable bearings, diagrammatically illustrated in Figure 2 at 48 and 50. Since the torque delivered to the shaft 26 through the magnetic coupling comprising the magnets 46 and 12, upon movements of the compass card 10, is relatively slight, it will also be appreciated that the friction between the bearings 48, 50 and the shaft 26 should be maintained as low as possible, in order to secure precise follow-up movement of the shaft 26. If this friction is excessive, it will be obvious that the load resulting therefrom may be of such magnitude as to prevent the slave magnets 46 from following the movements of the compass magnets 12 during changes in position of the compass card 10.

An additional source of undesired friction which has been inherent in previous systems of the foregoing type results from the manner in which the rotor 24 of the transmitter 16 has been energized from the external source. For example, the rotor may be energized from an alternating current source through the use of slip-rings, brushes or sliding contacts, it being obvious that the use of such constructions would result in imposing an additional frictional load tending to prevent free and efficient rotation of the shaft 26.

One of the features of the present invention hence resides in the provision of novel means whereby static friction existing between the shaft 26 and the bearings in which said shaft is mounted is eliminated, and the rotor 24 is energized without the necessity of employing frictional means such as slip-rings, brushes or sliding contacts of any nature whatsoever. As shown such means includes a coupling transformer 52 having relatively stationary and rotatable primary and secondary windings 54 and 56 respectively, the latter being electrically connected with the rotor 24, and the former being connected through leads 58 and 60 to a suitable source of alternating current. Referring more particularly to Figure 2, the coupling transformer 52 is illustrated therein as being of the shell type having an outer relatively stationary core portion 62 housing the primary winding 54 and an inner relatively rotatable core portion 64 housing the secondary winding 56, the portion 64, as well as core 65 associated with rotor winding 24, being secured to the shaft 26, and the winding 56 and rotor winding 24 being electrically connected, as shown. With such an arrangement, it will be readily perceived that the rotor winding 24 is energized from the source of alternating current through the coupling transformer 52, and hence all friction, which would have existed in the event of the use of contact devices, is eliminated.

In order to eliminate the static friction between the shaft 26 and bearings 48, 50, the primary and secondary portions of the transformer 52 are arranged in a novel manner. As shown in Figure 2 the relatively rotatable core portion 64 is normally offset axially with respect to the relatively stationary core portion 62, the shaft 26 being so mounted as to be capable of a limited amount of axial movement in order to bring the portions 62 and 64 into co-planar relationship. Preferably, suitable means, such as a spring 66, may be interposed between the upper end of the shaft 26 and a stationary member in order to normally maintain the parts in the position illustrated, when the primary winding 54 is de-energized.

With the above-described construction, it will be readily understood that upon energization of the primary winding 54 from the alternating current source, the magnetic action between the primary and secondary windings will exert a definite lifting effect upon the latter and will draw the secondary core portion 64 upwardly into horizontal alignment with the primary core portion 62. Moreover, since the transformer 52 is excited with alternating current, this lifting effect will be vibratory in character and provides, with the spring 66, a slight, periodic axial vibration, the frequency of which is proportional to the frequency of the current supplied to the primary winding 54 from the source. Such periodic vibration of the secondary core portion 64 and shaft 26 to which it is secured, eliminates all static friction between the said shaft and the bearings in which it is mounted, thus enabling the shaft and parts secured thereto to readily follow variations in movement of the compass card 10 through the magnetic coupling constituted by the slave magnets 46 and compass magnets 12.

It will be evident from the foregoing that the position of the rotor 24 will correspond precisely to the position of the compass card 10, and as the positional relationship between the rotor 24 and the stator windings of the transmitter 16 varies, single phase voltages will be induced in the stator windings 18, 20 and 22, the ratio of which will be dependent upon the position of the rotor 24 with respect to the said stator windings. Such voltages combine in the stator windings 30, 32 and 34 of the receiver 28 to produce a single phase alternating flux vector, in known manner, the direction of which, relative to the stator windings 30, 32 and 34, depends upon the ratio of the single phase exciting voltages from the stator windings of the transmitter 16, and hence upon the position of the rotor 24 of said transmitter. It will be understood that a voltage will likewise be induced in the rotor winding 36 of the receiver 28, the amplitude and phase of which will depend upon the relation between the said rotor and the flux vector.

For purposes of illustration, the line 68, associated with rotor 24 indicates magnetic north and when the said rotor, compass card 10 and rotor 36, occupy the positions shown, the latter is in a null position with respect to the stator windings 30, 32 and 34. Under these conditions, a pointer 70, associated with the stator 36 and adapted to cooperate with a suitable relatively stationary scale, not shown, will indicate magnetic north. Should the craft on which the compass is mounted, however, change its heading, it will be understood that a voltage will be induced in rotor winding 36, due to the resultant flux vector produced by the stator windings 30, 32 and 34.

Means are provided for utilizing the voltage induced in the rotor winding 36 in order to rotate the latter and restore it to a null position, in agreement with the position of the transmitter rotor 24. As shown, such means comprises a two phase induction motor 72 which is mechanically coupled to the shaft 38 as by means of any suitable type of reduction gearing 74, the motor being provided with a pair of field windings 76 and 78 arranged in quadrature. Winding 76 is adapted to be energized from the rotor winding 36, through a suitable amplifier 80, a coupling transformer 82, similar to the coupling transformer 52, being preferably employed between the winding 36 and the input of the amplifier. The use of the transformer 82 provides a more efficient and reliable means for transmitting the relatively low power level voltage from the rotor to the amplifier, than would be afforded by the use of sliding contacts. Winding 78 is arranged to be energized by the same source of alternating current that supplies the energy for exciting the transmitter 16, the said winding being connected to the source by leads 84 and 86 a phasing condenser 88 being included in one of the leads. With such an arrangement, the motor 72 is rendered self-starting and upon energization of winding 76, operates to restore the rotor winding 36 to a null position where the pointer 70 will be in agreement with the position of the rotor 24 and compass card 10.

In operation, with the parts occupying the positions illustrated on the drawing and the craft on which the mechanism is mounted, heading magnetic north, winding 36 occupies the null position with respect to the stator windings 30, 32 and 34, and the indicating device associated with the pointer 70 gives a remote indication of the heading of the craft.

In the event, however, that the heading is changed, it will be evident that the slave magnets 46, shaft 26 and rotor 24 will follow the movement of the compass card 10 and magnets 12 connected therewith, the change in relative position between the rotor 24 and stator windings 18, 20 and 22 causing a variation in the voltages induced in the said stator windings, which through the stator windings 30, 32 and 34 of the receiver, will exert an unbalanced inductive effect upon the rotor winding 36. This will induce an alternating voltage in the latter, which in turn produces an alternating voltage in the field winding 76. Motor 72 immediately starts rotation and through the shaft 38 and gear reduction means 74, rotates the rotor 36 and pointer 70 back to a null position corresponding to the new position of the compass card 10 and rotor 24 with respect to the craft. Upon reaching the new null position, the voltages in the stator windings 30, 32 and 34 reach a balanced condition in their inductive relationship with the rotor 36, and since, under these conditions, no voltage will be induced in the latter, the motor comes to rest. It will be understood that while the pointer 70 may be adapted to cooperate with a suitable compass card or scale, the motion of the rotor 36 may be employed to operate the rotor of a self-synchronous telemetric motor, through a one-to-one driving connection, in which event the said motor may be used as a master transmitter and may be associated with any desired number of self-synchronous repeaters, in a well-known manner. In such event, the pointer 70 and indicator card associated therewith may preferably be used in connection with the rotor of the master transmitter and similar pointers and indicator cards may be associated with each of the repeaters in order to provide a plurality of remote compass indicators.

It will be understood that with the mechanism in operation, shaft 26 will be periodically vibrated in order to eliminate static friction between the shaft and the bearings associated therewith, through the action of the coupling transformer 52, as heretofore set forth in detail. Moreover, the voltage induced in the rotor 36 is effectively transferred to the amplifier 80 by the coupling transformer 82, without the probability of energy loss which would be occasioned if sliding contacts were utilized, it being pointed out, that the coupling transformer 82 is similar to the coupling transformer 52 except that the two core portions are not axially offset. This will be clear when it is borne in mind that there is no problem of friction present in operating the rotor 36, as in the case of the shaft 26 which is required to precisely follow the movements of the compass card 10.

While one embodiment of the invention has been illustrated and described herein, it will be understood that the same is not limited thereto, but may be embodied in other forms. For example, while the invention has been particularly described in connection with the remote indication of the readings of a compass, the system may be employed for remotely indicating any variable function, if desired. It will also be understood that the receiver of the novel system, instead of being employed to function as a remote indicator, may be utilized for control purposes, as for example, to steer the craft on which the apparatus is mounted. Various other changes in form, construction and relative arrangement of parts and circuits may be resorted to without departing from the scope of the invention, as will now appear to those skilled in the art. Reference will therefore be had to the appended claims for a definition of the limits of the invention.

What is claimed is:

1. A magnetic compass system comprising a compass magnet mounted for movement in response to the earth's magnetic field, an axially displaceable and rotatable shaft having a slave magnet mounted thereon and arranged in magnetic relation to said compass magnet whereby movements of the latter are transmitted to said slave magnet and shaft, bearings for supporting said shaft, means for mounting said shaft for limited axial movement in opposite directions within said bearings, means including a wound rotor and a wound stator for electrically transmitting rotation of said shaft to a remote point, said rotor being carried by said shaft, and means for periodically axially displacing said shaft in the bearings comprising a coupling transformer having a winding rotatable with the shaft and connected with said rotor and another winding fixed relative to said stator and offset axially from said rotatable winding and adapted to be connected to an alternating current source to move said rotatable winding axially substantially into alignment with the fixed winding.

2. A magnetic compass system comprising a compass magnet mounted for movement in response to the earth's magnetic field, an axially displaceable and rotatable shaft having a slave magnet mounted thereon and arranged in magnetic relation to said compass magnet whereby movements of the latter are transmitted to said slave magnet and shaft, indicating means, means to transmit movements of said shaft to said indicating means, bearings for supporting said shaft, means for mounting said shaft for limited axial movement in opposite directions within said bearings, and means comprising an electromagnetic induction device having a rotor mounted on the shaft and a stator offset axially therefrom and adapted to be energized from an external source of alternating current for axially displacing said shaft in said bearings by moving said rotor winding into substantially transverse alignment with said stator and vibrating said shaft at a frequency proportional to the frequency of the source.

3. A compass system comprising a compass magnet responsive to the directive effect of the earth's magnetic field, a vertically arranged and axially displaceable rotatable shaft, magnetic pick-up means to rotate said shaft in accordance with movements of the compass magnet, indicating means, means to transmit movements of said shaft to said indicating means, bearings for supporting said shaft for rotation and axial displacement therein, yielding means urging said shaft axially in one direction and means for periodically axially displacing said shaft in said bearings in the opposite direction to vibrate said shaft and eliminate static friction between the bearings and shaft.

4. A compass system comprising a compass magnet responsive to the directive effect of the earth's magnetic field, a vertically arranged axially displaceable and rotatable shaft, magnetic pick-up means to rotate said shaft in accordance with movements of the compass magnet, a telemetric system including a self-synchronous transmitter and receiver for transmitting movements of said shaft and for receiving such movements at a remote point, bearings for supporting said shaft for rotation and axial displacement therein, yielding means urging said shaft axially in one direction and a single means for energizing said transmitter and for periodically axially displacing said shaft in said bearings in the opposite direction comprising a coupling transformer having a rotor winding rotatable with the shaft and offset axially from a stator winding connected with an alternating current supply.

5. A compass system comprising a compass magnet responsive to the directive effect of the earth's magnetic field, a vertically arranged axially displaceable and rotatable shaft, magnetic pick-up means to rotate said shaft in accordance with movements of the compass magnet, a telemetric system including a self-synchronous transmitter and receiver for transmitting movements of said shaft and for receiving such movements at a remote point, bearings for supporting said shaft for rotation and axial displacement therein, yielding means urging said shaft axially in one direction and an electromagnetic induction device associated with an external source of alternating current for periodically axially displacing said shaft in said bearings in the opposite direction to eliminate static friction therebetween.

6. A compass system as defined in claim 5 wherein the induction device includes coaxially arranged primary and secondary windings normally disposed out of alignment.

7. A compass system as defined in claim 5 wherein the induction device includes coaxially arranged primary and secondary windings, the secondary winding being electrically connected with said transmitter and normally lying in a plane displaced with respect to the plane of the primary winding.

8. Electrical apparatus comprising inductively associated stator and rotor windings, a shaft carrying said rotor winding, bearings in which said shaft is mounted, means for energizing said rotor winding from an external alternating current supply comprising a coupling transformer having inductively related coaxially arranged, primary and secondary windings, means for mounting said secondary winding on said shaft whereby the plane of the secondary winding is normally displaced with respect to the plane of the primary winding, and means for mounting said shaft for limited movement in opposite directions along its length within said bearings, whereby upon energization of said primary winding by said alternating current supply, said secondary winding will be periodically drawn into the plane of the primary winding and the shaft periodically vibrated in said bearings at a frequency proportional to the frequency of said source.

9. Electrical apparatus comprising inductively associated stator and rotor windings, a shaft carrying said rotor winding and mounted for limited axial movement upon energization of said rotor winding, and means for energizing said rotor winding from an external alternating current supply without the use of slip rings or brushes, said means comprising a coupling transformer having inductively related coaxially arranged primary and secondary windings, said primary winding being relatively stationary and said secondary winding being carried by said shaft in co-axial relation with said rotor winding and being offset from said primary winding so that, upon energization of said rotor winding through said coupling transformer, said rotor winding is moved axially substantially into alignment with said primary winding as a result of the electromagnetic reaction between said primary and secondary windings of said coupling transformer.

10. Electrical apparatus including inductively associated stator and rotor windings, a shaft carrying said rotor winding, bearings mounting said shaft for rotation and limited axial displacement, yielding means urging said shaft axially in one direction, and means for energizing said rotor winding from an external alternating supply and for axially displacing said shaft against the force of said yielding means including a coupling transformer having inductively related windings, one of said windings being mounted on said shaft and being rotatable relative to said other winding and being offset from said other winding, said first-mentioned winding being moved substantially into alignment with said other winding upon energization of said other winding.

11. Electrical apparatus including inductively associated stator and rotor windings, a shaft carrying said rotor winding, bearings mounting said shaft, means for mounting said shaft for limited axial movement in opposite directions within said bearings, and means for energizing said rotor winding from an external alternating current supply and for vibrating said shaft axially in its bearings comprising a coupling transformer having inductively related windings, one of said windings being carried by said shaft and being rotatable relative to said other winding and being vibrated axially relative to said other winding upon energization of said other winding.

12. Electrical apparatus including inductively associated stator and rotor windings, a shaft carrying said rotor winding, bearings mounting said shaft for rotation and limited axial displacement, yielding means urging said shaft axially in one direction, and means for energizing said rotor winding from an external alternating supply and for axially displacing said shaft against the force of said yielding means including a coupling transformer having inductively related windings, one of said windings being mounted on said shaft and being rotatable relative to said other winding and being moved axially relative to said other winding upon energization of said other winding.

13. Electrical apparatus including inductively associated stator and rotor windings, a shaft carrying said rotor winding, bearings mounting said shaft, means for mounting said shaft for limited axial movement in opposite directions within said bearings, means for energizing said rotor winding from an external alternating supply and for axially displacing said shaft in said bearings including a coupling transformer having inductively related windings, one of said windings being mounted on said shaft and being rotatable relative to said other winding and being offset from said other winding, said first-mentioned winding being moved substantially into alignment with said other winding upon energization of said other winding.

PAUL A. NOXON.
WLADIMIR A. REICHEL.

REFERENCES CITED

The following references are of record in the file of this patent:

UNITED STATES PATENTS

| Number | Name | Date |
|---|---|---|
| Re. 22,409 | Lyman et al. | Dec. 21, 1943 |
| 1,998,938 | Mittag | Apr. 23, 1935 |
| 2,038,059 | Reichel et al. | Apr. 21, 1936 |
| 2,313,682 | Stuart | Mar. 9, 1943 |
| 2,316,873 | Kollsman | Apr. 20, 1943 |
| 2,356,186 | Sommers | Aug. 22, 1944 |
| 2,446,290 | Lovegrove | Aug. 3, 1948 |

FOREIGN PATENTS

| Number | Country | Date |
|---|---|---|
| 539,817 | Great Britain | Sept. 25, 1941 |